United States Patent Office

2,995,600
Patented Aug. 8, 1961

2,995,600
PROCESS FOR PREPARING OXYGENATED COMPOUNDS OF THE 2,6-DIMETHYL-OCTANE SERIES
Robert L. Webb, Jacksonville, Fla., assignor to The Glidden Company, Cleveland, Ohio, a corporation of Ohio
No Drawing. Filed June 19, 1958, Ser. No. 743,022
22 Claims. (Cl. 260—488)

This invention provides a novel process for preparing alcohols, esters and other oxygenated compounds of the unsaturated 2,6-dimethyl-octane series.

Unsaturated derivatives of 2,6-dimethyl-octane are widely distributed in nature. Linalool, geraniol, nerol, citronellol and their esters are among the most valuable of the unsaturated 2,6-dimethyl-octane derivatives. All of these compounds are of value as odorants. Since the supply of these compounds depends upon the importation of expensive essential oils whose quality and availability varies from time to time, it would be desirable to prepare derivatives of the unsaturated 2,6-dimethyl-octane series from a readily available domestic raw material and this is one object of my invention.

The cheapest and most readily available unsaturated 2,6-dimethyl-octane compounds are those produced by pyrolysis of the pinenes which are the principle constituents of the various turpentines. Thus, it is known that the pyrolysis of α-pinene under controlled conditions gives predominately 2,6-dimethyl-2,4,6-octatriene (alloocimene) whereas the pyrolysis of β-pinene yields predominately 2-methyl-6-methylene - 2,7 - octadiene (myrcene). Further, turpentines, such as gum turpentine or sulfate turpentine can be pyrolyzed under conditions applicable to the pyrolysis of the individual pinenes, suitably in the vapor phase, at say, about 500° C., to give high yields of myrcene and alloocimene. Alloocimene and myrcene can be selectively hydrogenated to give their dihydro and tetrahydro derivatives. Hydrogenation catalysts employed for hydrogenation of the acyclic trienes to the desired dihydro and tetrahydro derivatives can be any suitable one, such as platinum, palladium or various commercial nickel catalysts, etc. Thus, the pyrolysis products of α-pinene, β-pinene and mixtures thereof, such as turpentine, are readily available raw materials for the preparation of oxygenated unsaturated 2,6-dimethyl-octane compounds.

It is an object of this invention to provide a process for producing valuable odorant compounds of the unsaturated 2,6-dimethyl-octane series from α-pinene, β-pinene, pinane and their hydrogenation products.

It is a further object of this invention to produce novel allylic alcohols, lower molecular weight esters and ethers of said alcohols, all valuable in perfumery, from the unsaturated 2,6-dimethyl octane series.

It is yet another object of this invention to produce novel allylic chlorides from the unsaturated 2,6-dimethyl octane series, said chlorides being convertible to novel allylic alcohols, esters and ethers for use in the odor and perfume industries. Further important objects of my invention will be found in the specification.

In conformity with the expressed objects above, I treat unsaturated hydrocarbons of the 2,6-dimethyl-octane series individually or as mixtures with chlorine at temperatures ranging from 10° C. to 125° C. to produce allylic chlorides. These allylic chlorides can then be hydrolyzed to allylic alcohols by stirring with water at temperatures ranging from 25° C. to 175° C. in the presence of an HCl acceptor such as calcium carbonate, calcium hydroxide, KOH, sodium hydroxide, sodium carbonate, etc. The resulting allylic alcohols can be separated and purified by the common methods such as fractional distillation, preparation of crystalline derivatives, etc. The allylic chlorides can also be reacted with metal salts of organic acids to produce allylic esters or can be reacted with metal alkoxides or alcoholic caustic solutions to produce allylic ethers.

The compounds which I have employed to obtain the novel chlorides and oxygenated derivatives of the unsaturated 2,6-dimethyl octane series are acyclic 10 carbon atom terpenes containing a terminal dimethyl group adjacent to a double bond as shown by the following structural formula:

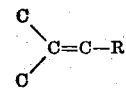

R, representing the remainder of the $C_{10}$ terpene molecule. I have found that upon adding one mole of chlorine, the chlorination occurs at the double bond, which is thereby shifted to form an allylic chloride. The reaction is a substitution reaction resulting in the formation of hydrogen chloride. The following are exemplary unsaturated terpenes containing a terminal dimethyl group adjacent to a double bond:

2-methyl-6-methylene-2,7-octadiene (myrcene)
2,6-dimethyl-2,4,6-octatriene (alloocimene)
2-methyl-6-methylene-2-octene
2,6-dimethyl-2,6-octadiene (cis and trans-dihydromyrcene)
2,6-dimethyl-2,7-octadiene
2,6-dimethyl-2-octene (tetrahydro myrcene and alloocimene)

All of these compounds can be prepared by the procedures described above.

The temperature at which I can conduct the chlorination is not critical, but I prefer to use temperatures from 25° C. to 100° C. because excessive cooling or heating is not required. When one mole of chlorine as preferred in the practice of my invention, is introduced into the unsaturated 2,6-dimethyl-octane hydrocarbon, the reaction is exothermic and HCl is evolved. With the more reactive hydrocarbons such as alloocimene and myrcene, it is advantageous to chlorinate them in the presence of an HCl acceptor such as sodium carbonate or sodium bicarbonate. This minimizes side reactions such as polymerization or HCl addition to reactive double bonds. The chlorination may be carried out using gaseous chlorine, sodium hypochlorite or calcium hypochlorite solutions, chloroureas or other chlorinating agents, but I prefer to use gaseous chlorine since it is economical and easy to handle.

The second step of my process involve the hydrolysis of the allylic chlorides resulting from the chlorination of the unsaturated 2,6-dimethyl-octane hydrocarbons. The hydrolysis temperatures are not critical. As a general rule, hydrolysis at temperatures below 25° C. is too slow to be practical whereas hydrolysis at temperatures above 125° C. causes some dehydrochlorination which gives lower yields of desirable product. Thus, I prefer to carry out the hydrolysis at temperatures between 75° C. and 100° C. In this temperature range the hydrolysis rate is rapid, the rate of dehydrochlorination of the allylic chloride is very slow and relatively inexpensive equipment is required.

The process of my invention, in addition to hydrolysis in aqueous alkaline medium of the allylic monochlorides of the unsaturated terpene hydrocarbon noted, also includes the treatment of these allylic monochlorides with metal salts of lower molecular weight organic acids such as acetic, propionic, butyric to produce novel allylic esters containing a lower alkanoyloxy substituent and possessing fragrant odors. Also, the allylic monochlorides can be reacted with the lower molecular weight alkoxides or alcoholic caustic solutions such as methanol, ethanol and the like, to produce novel allylic ethers, containing a lower alkoxy substituent and possessing fragrant odors and thus useful in perfumery as solvents or fixatives for perfumes. Examples of these novel compositions will be illustrated hereinafter. It should be noted here that although I have included as novel compositions, allylic esters and ethers of the unsaturated 2,6-dimethyl octane series, that these compositions can in turn be treated to convert them to alcohols. For example, the acetate produced by the reactions described and illustrated in the later examples can be converted to the free alcohol, if desired, by saponification with aqueous caustic and then fractionated through an efficient column to recover the alcohol.

The following examples further describe the nature and breadth of this invention.

EXAMPLE 1

One mole of hydrogen was added to 1500 grams of myrcene, 95 to 98%, in the presence of 1.0% by weight of a commercial nickel catalyst at 85° C. to 100° C. under a hydrogen pressure of 40 to 60 p.s.i.g. The hydrogenation product was filtered to remove catalyst. Fractionation through an efficient column, followed by infrared spectroanalysis of the fractions indicated that the hydrogenation product was 90 to 95% 2-methyl-6-methylene-2-octene, B.P.$_{100\ mm.}$ 100 to 101° C., $N_D^{25}$ 1.4439, $D_4^{25}$ 0.7669, and 8 to 10% 2,6-dimethyl-2,7-octadiene, B.P.$_{100\ mm.}$ 94.5° C., $N_D^{25}$ 1.4363, $D_4^{25}$ 0.7583.

Identification of compounds

The compound boiling at 94.5° C. at 100 mm. contained a monosubstituted ethylenic double bond, a vinyl group, and a trisubstituted ethylenic bond as shown by the presence of the characteristic monosubstituted ethylenic and trisubstituted ethylenic bond absorptions in the infrared spectrum at 11.0$\mu$ and 12.3$\mu$ respectively. The catalytic addition of one mole of hydrogen to the hydrocarbon at 25 to 35° C. in the presence of 0.2% by weight of PtO$_2$ under a hydrogen pressure of 40 to 60 p.s.i.g. gave 2,6-dimethyl-2-octene, B.P.$_{100\ mm.}$ 99° C., $N_D^{25}$ 1.4268, $D_4^{25}$ 0.752. From the above data it is evident that the compound boiling at 94.5° C. at 100 mm. is 2,6-dimethyl-2,7-octadiene.

The compound boiling at 100 to 101° C. at 100 mm. contained a disubstituted terminal methylene group and a trisubstituted ethylenic bond as shown by the presence of the characteristic disubstituted terminal methylene and trisubstituted ethylenic bond absorptions in the infrared spectrum at 11.3$\mu$ and 12.3$\mu$ respectively. The catalytic addition of one mole of hydrogen as shown above gave 2,6-dimethyl-2-octene as determined by infrared spectroanalysis. From the above data it is evident that the compound boiling at 100–101° C. at 100 mm. is 2-methyl-6-methylene-2-octene.

EXAMPLE 2

One mole of hydrogen was added to 1500 grams of myrcene, 95 to 98%, in the presence of 0.2% by weight of 5.0% Pd on carbon at 25–35° C. under a hydrogen pressure of 40 to 60 p.s.i.g. The hydrogenation product was filtered to remove catalyst and fractionated through an efficient column at 100 mm. pressure. Infrared spectroanalysis of the fractions indicated that the hydrogenation product was 65 to 70% trans-2,6-dimethyl-2,6-octadiene, B.P.$_{100\ mm.}$ 102° C., $N_D^{25}$ 1.4438, $D_4^{25}$ 0.7911 and 30 to 35% cis-2,6-dimethyl-2,6-octadiene, B.P.$_{100\ mm.}$ 104° C., $N_D^{25}$ 1.4500, $D_4^{25}$ 0.8055.

EXAMPLE 3

Two moles of hydrogen were added to 1500 grams of myrcene, 95 to 98%, in the presence of 1.0% by weight of a commercial nickel catalyst at 85 to 100° C. under a hydrogen pressure of 40 to 60 p.s.i.g. The hydrogenation product was filtered to remove catalyst. Fractionation at 100 mm. followed by infrared spectroanalysis of the fractions indicated that the hydrogenation product was 93 to 95% 2,6-dimethyl-2-octene, B.P.$_{100\ mm.}$ 99° C., $N_D^{25}$ 1.4268, $D_4^{25}$ 0.752.

EXAMPLE 4

Alloocimene was produced by pyrolysis of alpha pinene and the mixture of "A" and "B" forms (Hopfield, et al., J.A.C.S. 66, page 115) which boiled at 126 to 128° C. at 100 mm. and showed $N_D^{25}$ 1.5418 and $D_4^{25}$ 0.806 was hydrogenated in the presence of 0.2% of 5% Pd on carbon at 25 to 50° C. under a hydrogen pressure of 40 to 60 p.s.i.g. until 2 moles of hydrogen had been absorbed for each mole of alloocimene present. After removal of the catalyst by filtration, the product was fractionated at 100 mm. pressure and the fractions were analyzed by infrared analysis. This analysis indicated that the hydrogenation product was 35–40% trans-2,6-dimethyl-4-octene, B.P.$_{100\ mm.}$ 89° C., $N_D^{25}$ 1.4169, Sp. G. at 15.5° C. 0.735, 25 to 30% 2,6-dimethyl-3-octene, B.P.$_{100\ mm.}$ 95° C., $N_D^{25}$ 1.4231, Sp. G. at 15.5° C. 0.748, and 35–40% 2,6-dimethyl-2-octene.

EXAMPLE 5

Nineteen hundred grams (1900 g.) myrcene (95%) and 1170 grams of sodium bicarbonate were stirred while 986 grams of chlorine was bubbled into the mixture at 25 to 35° C. The reaction was exothermic and an ice bath was required to maintain the temperature below 35° C. The chlorination product was filtered and dried to yield 2270 grams.

Identification of chlorination product

Infrared spectro-analysis of the chlorination product indicated that it contained a monosubstituted terminal methylene group and two disubstituted terminal methylene groups as shown by the intensity of the characteristic monosubstituted terminal methylene group and disubstituted terminal methylene group absorptions at 11.0 $\mu$ and 11.3 $\mu$ respectively. Ultraviolet spectro-analysis of the chlorination product indicated that the conjugation in myrcene was not affected by the chlorination as shown by the intensity of the absorption at 225 m$\mu$. From the above data, it is shown that the chlorination product is 3-chloro-2-methyl-6-methylene-1,7-octadiene.

EXAMPLE 6

One thousand (1000) grams of chlorination product from Example 5, 2,000 ml. of water and 250 grams of calcium carbonate were stirred at 80–85° C. for 12 hours. The mixture was filtered to remove unreacted calcium carbonate and the oil layer separated and dried. Eight hundred and ten (810) grams of dried oil was recovered. This oil was fractionated through an efficient column at 10 mm. pressure. Infrared and ultraviolet spectroanalysis of the fractions indicated that the hydrolysis product was 35–40% hydrocarbons, 20–25% 2-methyl-6-methylene-1,7-octadiene-3-ol (B.P.$_{10\ mm.}$ 90–95° C.) 10–15% 2-methyl-6-methylene-2,7-octadiene-1-ol (B.P.$_{10\ mm.}$ 104–108° C.) and 25% polymeric materials.

Identification of compounds

Infrared spectroanalysis of the fraction boiling at 90–95° C. at 10 mm. indicated that it was a secondary alcohol having one monosubstituted terminal methylene group and two disubstituted terminal methylene groups as shown by the presence of the characteristic secondary alcohol, monosubstituted terminal methylene group and disubstituted terminal methylene group absorptions at 10 $\mu$, 11 $\mu$, and 11.3 $\mu$ respectively. Ultraviolet spectroanalysis of this alcohol indicated that it has the conjugated system present in myrcene as shown by the intensity of an absorption at 225 m$\mu$. The catalytic addition of three moles of hydrogen to the alcohol in the presence of 0.2% platinum oxide under a hydrogen pressure of 40–60 p.s.i.g. at 25–30° C. gave 2,6-dimethyl-octane-3-ol as shown by the comparison of the infrared spectrum of the hydrogenation product with the infrared spectrum of a known sample of 2,6-dimethyl-octane-3-ol. From the above data it is shown that the fraction boiling at 90 to 95° C. at 10 mm. is 2-methyl-6-methylene-1,7-octadiene-3-ol.

Infrared spectroanalysis of the fraction boiling at 104–108° C. at 10 mm. indicated that it was a primary alcohol having a monosubstituted terminal methylene, a disubstituted terminal methylene and a trisubstituted ethylenic bond as shown by the presence of the characteristic primary alcohol, monosubstituted terminal methylene group, disubstituted terminal methylene group and trisubstituted ethylenic bond absorptions at about 9.5 $\mu$, 11.0 $\mu$, 11.3 $\mu$, and 12.3 $\mu$ respectively. Ultraviolet spectroanalysis of the primary alcohol indicated that it contained the conjugate system of myrcene as shown by the intensity of the absorption at 225 m$\mu$. From the above data it is shown that the fraction boiling at 104–108° C. at 10 mm. is 2-methyl-6-methylene-2,7-octadiene-1-ol.

EXAMPLE 7

Five hundred (500) grams of the chlorination product from Example 5 (3-chloro-2-methyl-6-methylene-1,7-octadiene) was mixed with 1,000 grams of methanolic KOH (25% KOH). The reaction was exothermic and caused the methanol to reflux. When the reaction mixture had cooled, it was diluted with water and 420 grams of oil was recovered. Fractional distillation of the oil through an efficient column at 10 mm. pressure followed by an infrared and ultraviolet spectroanalysis of the fraction indicated that the reaction product was 35–40% hydrocarbons, 20–25% 3-methoxy-2-methyl-6-methylene-1,7-octadiene (B.P.$_{10\ mm.}$ 73–75° C.), 20–25% 1-methoxy-2-methyl-6-methylene-2,7-octadiene (B.P.$_{10\ mm.}$ 83–87° C.) and 12% polymeric materials.

Identification of compounds

The position of the double bonds was determined by infrared and ultraviolet spectroanalysis as shown in Example 6. The catalytic addition of three moles of hydrogen to the unsaturated ethers gave 3-methoxy-2,6-dimethyl octane and 1-methoxy-2,6-dimethyl octane as determined by comparing the infrared spectra of these hydrogenation products with the infrared spectra of known samples of 3-methoxy-2,6-dimethyl octane and 1-methoxy-2,6-dimethyl octane. From the above data it is shown that the unsaturated ether boiling at 73–75° C. at 10 mm. is 3-methoxy-2-methyl-6-methylene-1,7-octadiene and the unsaturated ether boiling at 83–87° C. at 10 mm. is 1-methoxy-2-methyl-6-methylene-2,7-octadiene.

EXAMPLE 8

One hundred and eighty-eight (188) grams of alloocimene (95+%) (a mixture of alpha and beta forms) and 116 grams of sodium bicarbonate were stirred at 10 to 25° C. while 98 grams of chlorine was bubbled into the mixture. The reaction was exothermic and an ice bath was required to keep the temperature below 25° C. The chlorination product was filtered to yield 223 grams of oil.

Identification of chlorination products

Infrared spectroanalysis of the chlorination product indicated that it contained a disubstituted terminal methylene group, a symmetrically disubstituted ethylenic bond and a trisubstituted ethylenic bond as shown by the presence of the characteristic disubstituted terminal methylene group, symmetrically disubstituted ethylenic bond and trisubstituted ethylenic bond absorptions at about 11.3 $\mu$, 10.4 $\mu$, and 12.3 $\mu$ respectively. Ultraviolet spectroanalysis of the chlorination product indicated that the symmetrically disubstituted ethylenic bond and the trisubstituted ethylenic bond were conjugate as shown by the presence of an absorption at 232 m$\mu$. From the above data it is shown that the chlorination product is 3-chloro-2,6-dimethyl-1,4,6-octatriene.

EXAMPLE 9

Two hundred (200) grams of the chlorination product from Example 8 (3-chloro-2,6-dimethyl-1,4,6-octatriene) was stirred with 500 ml. of an aqueous 30% KOH. The mixture warmed slightly on stirring and a cooling bath was required to keep the temperature below 30° C. After two hours of stirring, 173 grams of a pleasant smelling oil was separated. This oil was fractionated through an efficient column at 10 mm. pressure and the fractions were analyzed by infrared and ultraviolet spectroanalysis. The analysis indicated that the hydrolysate was 20–25% hydrocarbons, 20–25% secondary alcohols (B.P.$_{10\ mm.}$ 93–98° C.), 10–15% 2,6-dimethyl-2,4,6-octatriene-1-ol (B.P.$_{10\ mm.}$ 115–120° C.) and 42% polymeric materials.

Identification of compounds

The catalytic addition of three moles of hydrogen to the secondary alcohol fraction (B.P.$_{10\ mm.}$ 93–98° C.) gave a hydrogenation product which contained 2,6-dimethyl-octane-3-ol, 2,6-dimethyl-octane-4-ol, and 2,6-dimethyl-octane-7-ol as well as an unidentified secondary alcohol of the 2,6-dimethyl-octane series, as determined by comparing the infrared spectrum of the hydrogenation product with the infrared spectra of known samples of 2,6-dimethyl-octane-3-ol, 2,6-dimethyl-octane-4-ol and 2,6-dimethyl-octane-7-ol. From the above data it is shown that the secondary alcohol fraction is a mixture of secondary alcohols of the 2,6-dimethyl-octatriene series, probably resulting from allylomerization during hydrolysis of the 3-chloro-2,6-dimethyl-1,4,6-octatriene. Ultraviolet spectronanalysis of the primary alcohol fraction (B.P.$_{10\ mm.}$ 115–120° C.) indicated that it contained a conjugated triene as shown by the presence of an absorption at 277 m$\mu$. The catalytic addition of three moles of hydrogen to the primary alcohol fraction gave 2,6-dimethyl-octane-1-ol as determined by comparison of the infrared spectrum of the hydrogenation product with the infrared spectrum of a known sample of 2,6-dimethyl-octane-1-ol. The spectra were identical. From the above data, it is shown that the primary alcohol fraction boiling at 115–120° C. at 10 mm. is 2,6-dimethyl-2,4,6-octatriene-1-ol.

EXAMPLE 10

One thousand (1000) grams of 2-methyl-6-methylene-2-octene was chlorinated by bubbling 514 grams of chlorine into it at 65–70° C. The reaction was exothermic and no heat was required to maintain the temperature. One thousand, two hundred and fifty-eight (1,258) grams of chlorination product was recovered.

Identification of chlorination product

Infrared spectroanalysis of the chlorination product indicated that it contained two disubstituted terminal methylene groups as shown by the intensity of the characteristic disubstituted terminal methylene group absorption at 11.3 $\mu$. This data shows that the chlorination product is 3-chloro-2-methyl-6-methylene-1-octene.

EXAMPLE 11

Twelve hundred (1200) grams of the chlorination product from Example 10 (3-chloro-2-methyl-6-methylene-1-octene) was stirred with 1200 ml. of water and 600 grams of calcium carbonate at 90–100° C. for 12 hours. The mixture was filtered to remove unreacted calcium carbonate and the oil layer (1040 grams) was fractionated through an efficient column at 10 mm. pressure. Infrared spectroanalysis of the fractions indicated that the hydrolysate was 8% hydrocarbons, 8–10% unreacted 3-chloro-2-methyl-6-methylene-1-octene, 35–40% 2-methyl-6-methylene-1-octene-3-ol (B.P.$_{10\ mm.}$ 93–97° C.), 25–30% 2-methyl-6-methylene-2-octene-1-ol (B.P.$_{10\ mm.}$ 104–106° C.) and 12% residue.

Identification of compounds

Infrared spectroanalysis of the fraction boiling at 93–

97° C. at 10 mm. pressure indicated that it was a secondary alcohol containing two disubstituted terminal methylene groups as shown by the intensities of the characteristic secondary alcohol group and disubstituted terminal methylene group absorptions at about 10 $\mu$ and 11.3 $\mu$ respectively. The catalytic addition of two moles of hydrogen to this secondary alcohol gave 2,6-dimethyl-octane-3-ol as determined by comparing the infrared spectrum of the hydrogenation product with the infrared spectrum of a known sample of 2,6-dimethyl-octane-3-ol. From the above data it is shown that the fraction boiling at 93–97° C. at 10 mm. is 2-methyl-6-methylene-1-octene-3-ol.

Infrared spectroanalysis of the fraction boiling at 104–106° C. at 10 mm. pressure indicated that it was a primary alcohol containing a disubstituted terminal methylene group and a trisubstituted ethylenic bond as shown by the presence of the characteristic primary alcohol group, disubstituted terminal methylene group and trisubstituted ethylenic bond absorptions at about 9.5 $\mu$, 11.3 $\mu$ and 12.3 $\mu$ respectively. The catalytic addition of two moles of hydrogen to the fraction boiling at 104–106° C. at 10 mm. gave 2,6-dimethyl-octane-1-ol as determined by comparing the infrared spectrum of the hydrogenation product with the infrared spectrum of a known sample of 2,6-dimethyl-octane-1-ol. The spectra were identical. From the above data, it is shown that the fraction boiling at 104–106° C. at 10 mm. is 2-methyl-6-methylene-2-octene-1-ol.

EXAMPLE 12

One thousand grams (1000 grams) of 2,6-dimethyl-2,6-octadiene (mixture of cis- and trans-forms) and 514 grams of chlorine were reacted by bubbling the chlorine into the hydrocarbon at 65–75° C. The reaction was exothermic and no heat was required to maintain the temperature. Infrared spectroanalysis of the chlorination product (1252 grams) showed that it contained a disubstituted terminal methylene group and a trisubstituted ethylenic bond. These data and the products obtained by hydrolysis show that the chlorination product is 3-chloro-2,6-dimethyl-1,6-octadiene.

One thousand grams (1000) of the chlorination product, 1000 ml. of water and 500 grams of calcium carbonate were stirred at 90–105° C. for 12 hours. The excess calcium carbonate was dissolved with aqueous HCl to give 842 grams of hydrolyzed oils. Fractionation of these oils followed by infrared spectroanalysis of the fractions indicated that the hydrolysate was 3–5% hydrocarbons, 8–10% unreacted 3-chloro-2,6-dimethyl-1,6-octadiene, 45–50% 2,6 - dimethyl-1,6-octadiene-3-ol (B.P. $_{10\ mm.}$ 94–97° C.), 25–30% 2,6-dimethyl-2,6-octadiene-1-ol (B.P. $_{10\ mm.}$ 104–106° C.) and 10% polymeric materials.

*Identification of compounds*

Infrared spectroanalysis of the fraction boiling at 94°–97° C. at 10 mm. pressure indicated that it was a secondary alcohol containing a disubstituted terminal methylene group and trisubstituted ethylenic bond as shown by the presence of the characteristic secondary alcohol group, disubstituted terminal methylene group and trisubstituted ethylenic bond absorptions at about 10$\mu$, 11.3$\mu$ and 12.3$\mu$ respectively. The catalytic addition of two moles of hydrogen to this alcohol fraction gave 2,6-dimethyl-octane-3-ol as determined by comparing the infrared spectrum of the hydrogenation product with the infrared spectrum of a known sample of 2,6-dimethyl-octane-3-ol. The spectra were identical. From the above data, it is shown that the fraction boiling from 94–97° C. at 10 mm. pressure is 2,6-dimethyl-1,6-octadiene-3-ol.

Infrared spectroanalysis of the fraction boiling at 104–106° C. at 10 mm. pressure indicated that it was a primary alcohol containing two trisubstituted ethylenic bonds as shown by the intensities of the characteristic primary alcohol group and trisubstituted ethylenic bond absorptions at about 9.5$\mu$ and 12.3$\mu$ respectively. The catalytic addition of two moles of hydrogen to the fraction boiling at 104–106° C. at 10 mm. gave 2,6-dimethyl-octane-1-ol as determined by comparing the infrared spectrum of the hydrogenation product with the infrared spectrum of a known sample of 2,6-dimethyl-octane-1-ol. The spectra were identical. From the above data, it is shown that the fraction boiling at 104°–106° C. at 10 mm. pressure is 2,6-dimethyl-2,6-octadiene-1-ol.

EXAMPLE 13

One thousand (1000) grams of 2,6-dimethyl-2,7-octadiene and 514 grams of chlorine were reacted at 65 to 70° C. by bubbling the chlorine into the hydrocarbon. The reaction was exothermic and no heat was required to maintain the temperature. Infrared spectroanalysis of the chlorination product (1263 grams) indicated that it contained a monosubstituted terminal methylene group and a disubstituted terminal methylene group as shown by the presence of the characteristic monosubstituted terminal methylene group and disubstituted terminal methylene group absorptions at about 11.0$\mu$ and 11.3$\mu$ respectively. These data and the products obtained by hydrolyzing this chloride show that the chlorination product is 3-chloro-2,6-dimethyl-1,7-octadiene.

One thousand grams (1000) of the chlorination product (3-chloro-2,6-dimethyl-1,7-octadiene), 1000 ml. of water and 500 grams of calcium carbonate were stirred at 90–105° C. for 12 hours. The excess calcium carbonate was dissolved by adding HCl. Eight hundred and seventy-three (873) grams of hydrolyzed oil was recovered and fractionated through an efficient column at 10 mm. pressure. Infrared spectroanalysis of the fractions indicated that the hydrolysate was 5% hydrocarbons, 5–8% 3 - chloro - 2,6-dimethyl-1,7-octadiene, 50–55% 2,6-dimethyl-1,7-octadiene-3-ol (B.P. $_{10\ mm.}$ 90–95° C.) ($N_D^{25}$ 1.4566, $d_4^{25}$ 0.8714), 20–25% 2,6-dimethyl-2,7-octadiene-1-ol. (B.P. $_{10\ mm.}$ 103–105° C., $N_D^{25}$ 1.4679, $d_4^{25}$ 0.8979) and 8% high boiling polymeric material.

*Identification of compounds*

Infrared spectroanalysis of the fraction boiling at 90–95° C. at 10 mm. pressure indicated that it was a secondary alcohol containing a monosubstituted terminal methylene group and a disubstituted terminal methylene group as shown by the presence of the characteristic secondary alcohol group, monosubstituted terminal methylene group and disubstituted terminal methylene group absorptions at 10$\mu$, 11$\mu$ and 11.3$\mu$ respectively. The catalytic addition of two moles of hydrogen to this secondary alcohol gave 2,6-dimethyl-octane-3-ol as shown by comparing the infrared spectrum of the hydrogenation product with the infrared spectrum of a known sample of 2,6-dimethyl-octane-3-ol. The spectra were identical. From the above data it is shown that the fraction boiling at 90–95° C. at 10 mm. pressure is 2,6-dimethyl-1,7-octadiene-3-ol.

Infrared spectroanalysis of the fraction boiling at 103–105° C. at 10 mm. pressure indicated that it was a primary alcohol containing a monosubstituted terminal methylene group and a trisubstituted ethylenic bond as shown by the presence of the characteristic primary alcohol group, monosubstituted terminal methylene group and trisubstituted ethylenic bond absorptions at 9.5$\mu$, 11.0$\mu$ and 12.3$\mu$ respectively. The catalytic addition of two moles of hydrogen to the fraction boiling at 103–105° C. at 10 mm. pressure gave 2,6-dimethyl-octane-1-ol as determined by comparing the infrared spectrum of the hydrogenation product with the infrared spectrum of a known sample of 2,6-dimethyl-octane-1-ol. The spectra were identical. From the above data it is shown that the fraction boiling at 103–105° C. at 10 mm. pressure is 2,6-dimethyl-2,7-octadiene-1-ol.

EXAMPLE 14

One thousand (1000) grams of 2,6-dimethyl-2-octene (tetrahydromyrcene and tetrahydro alloocimene) and 507 grams of chlorine were reacted at 65–75° C. by bubbling the chlorine into the hydrocarbon. The reaction was exothermic and no heat was required to maintain the temperature. Infrared spectroanalysis of the chlorination product (1257 grams) indicated that it contained a disubstituted terminal methylene group as shown by the presence of the characteristic disubstituted terminal methylene group absorption at $11.3\mu$. These data and the products obtained by hydrolysis show that the chlorination product is 3-chloro-2,6-dimethyl-1-octene.

One thousand grams (1000) of the chlorination product, 1000 ml. of water and 500 grams of calcium carbonate were stirred at 90–100° C. for 12 hours. The excess calcium carbonate was dissolved with aqueous HCl and 869 grams of hydrolyzed oil was recovered. Fractionation of the hydrolysate followed by infrared spectroanalysis of the fractions indicated that the hydrolysate was 8% hydrocarbons, 10–12% unchanged 3-chloro-2,6-dimethyl-1-octene, 40–45%, 2,6 - dimethyl - 1-octene-3-ol (B.P. $_{10\ mm.}$ 84–87° C., $N_D^{25}$ 1.4464, $d_4^{25}$ 0.8583), 20 to 25% 2,6 - dimethyl - 2 - octene - 1 - ol (B.P. $_{10\ mm.}$ 100–103° C., $N_D^{25}$ 1.4514, $d_4^{25}$ 0.8577) and 11% high boiling polymeric material.

Identification of compounds

Infrared spectroanalysis of the fraction boiling at 84–87° C. at 10 mm. pressure indicated that it was a secondary alcohol containing a disubstituted terminal methylene group as shown by the presence of the characteristic secondary alcohol group and disubstituted terminal methylene group absorptions at $10.0\mu$ and $11.3\mu$ respectively. The catalytic addition of one mole of hydrogen to the fraction boiling at 84–87° C. at 10 mm. pressure gave 2,6-dimethyl-octane-3-ol as shown by comparing the infrared spectrum of the hydrogenation product with the infrared spectrum of the known sample of 2,6-dimethyl-octane-3-ol. The spectra were identical. From the above data it is shown that the fraction boiling at 84–87° C. at 10 mm. pressure is 2,6-dimethyl-1-octene-3-ol.

Infrared spectroanalysis of the fraction boiling at 100–103° C. at 10 mm. pressure indicated that it was a primary alcohol containing a trisubstituted ethylenic bond as shown by the presence of the characteristic primary alcohol group and trisubstituted ethylenic bond absorptions at $9.5\mu$ and $12.3\mu$ respectively. The catalytic addition of one mole of hydrogen to this fraction gave 2,6-dimethyl-octane-1-ol as shown by comparing the infrared spectrum of the hydrogenation product with the infrared spectrum of a known sample of 2,6-dimethyl-octane-1-ol. The spectra were identical. From the above data it is shown that the fraction boiling at 100–103° C. at 10 mm. pressure is 2,6-dimethyl-2-octene-1-ol.

EXAMPLE 15

Three hundred and forty-four (344) grams of 3-chloro-2,6-dimethyl-1-octene (prepared as shown in Example 14), 500 grams of glacial acetic acid and 205 grams of anhydrous sodium acetate were stirred at 94–105° C. for 6 hours. The reaction product was then washed with water followed by sodium bicarbonate wash to yield 328 grams of crude ester. The crude ester was fractionated through an efficient column at 10 mm. pressure. Infrared spectroanalysis of the fractions showed that the crude ester was 45–50% hydrocarbons, 5–8% unchanged 3-chloro-2,6-dimethyl-1-octene, 15–20% 2,6-dimethyl-1-octenol-3-acetate (B.P. $_{10\ mm.}$ 93–95° C.), 15–20% 2,6-dimethyl-2-octenol-1-acetate B.P. $_{10\ mm.}$ 108–112° C.) and 10% polymeric materials.

Although the sodium salt was used in the specific example shown, we have found that the identity of the metal is not critical and that potassium, ammonium, calcium and triethylamine salts may also be used and give similar results to those shown for sodium.

It will be appreciated from the foregoing examples that I have succeeded in preparing novel allylic alcohols, esters, ethers and chlorides in accordance with the objects of my invention. The novel chlorides produced are useful in the preparation of oxygenated derivatives of the unsaturated 2,6-dimethyl octane series as hereinabove illustrated. All of the novel allylic alcohols, esters and ethers possess fragrant and pleasant odors and are useful in the odor and perfume industries for preparing perfumes, scenting products such as soaps and related uses.

A review of the foregoing examples shows that the radical R in the formula

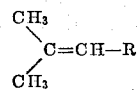

for the unsaturated 2,6-dimethyl octane derivative can be either saturated or contain either a single ethylenic double bond or two non-allenic ethylenic double bonds. These possibilities can be conveniently represented by the following general formula

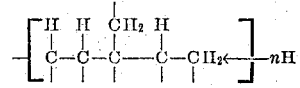

in which n is 2, 4 or 6 and any valencies not satisfied by hydrogen are satisfied by attachment to an adjacent carbon atom of the radical. The bracket radical is, of course, the same in the chlorinated compounds. On replacement of the chlorine group with hydroxy, alkoxy or acyloxy groups, analogous compounds having the same bracketed radical are produced, although as shown there may be partial isomerization within the bracketed radical in some cases.

Use in perfumery as employed herein means all uses of the materials either alone or in combination with other substances for their odor alone or to enhance a product odorwise or to mask other odors or as fixatives for such products.

Having thus described my invention, I claim:

1. An allylic derivative of the unsaturated 2,6-dimethyl octane series selected from those of the general formula

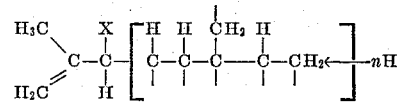

in which X is a radical selected from the group consisting of hydroxy, lower alkoxy and lower alkanoyloxy radicals, and n is a number selected from 2, 4 and 6, and characterized in that the valence of each of the carbon atoms of the radical within the bracket not shown as satisfied is satisfied by attachment to an adjacent carbon atom of said radical when not satisfied by hydrogen and in that when n is 4 the double bond is located other than between carbon atoms 6 and 7.

2. An allylic derivative of the unsaturated 2,6-dimethyl octane series selected from those of the general formula

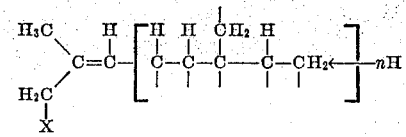

in which X is a radical selected from the group consisting of hydroxyl, lower alkoxy and lower alkanoyloxy radicals and n is a number selected from 2, 4 and 6 and characterized in that the valence of each of the carbon atoms of the radical within the bracket not shown as satisfied is satisfied by attachment to an adjacent carbon atom of the radical when not satisfied by hydrogen and in that when n is 4 the double bond is located between carbon atoms other than 6 and 7 and when n is 2 no double bond is located between carbon atoms 6 and 7.

3. A process for preparing an allylic alcohol of the 2,6-dimethyl-octane series which includes the steps of reacting an ethylenically unsaturated hydrocarbon of the general formula

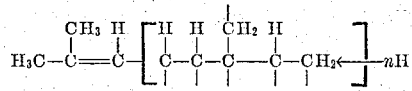

in which n is a number selected from 2, 4 and 6 and characterized in that the valence of each of the carbon atoms of the radical within the bracket not shown as satisfied is satisfied by attachment to an adjacent carbon atom of said radical when not satisfied by hydrogen, with chlorine on a mole per mole level and subjecting the resulting allylic chloride to hydrolysis in an aqueous alkaline medium.

4. A process for preparing a lower allylic ester of the 2,6-dimethyl-octane series which includes the steps of reacting an ethylenically unsaturated hydrocarbon of the general formula

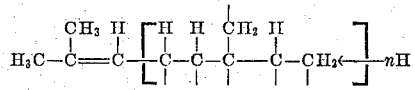

in which n is a number selected from 2, 4 and 6 and characterized in that the valence of each of the carbon atoms of the radical within the bracket not shown as satisfied is satisfied by attachment to an adjacent carbon atom of said radical when not satisfied by hydrogen, with chlorine on a mole per mole level until substantially one mole of chlorine has reacted with one mole of the hydrocarbon to produce an allylic chloride and hydrogen chloride and thereafter subjecting the resulting chlorinated product to reaction with salt of a lower molecular weight alkyl fatty acid.

5. A process for preparing a lower alkyl ether of the unsaturated 2,6-dimethyl-octane series which includes the steps of reacting an ethylenically unsaturated hydrocarbon of the general formula

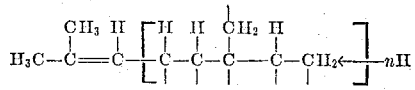

in which n is a number selected from 2, 4 and 6 and characterized in that the valence of each of the carbon atoms of the radical within the bracket not shown as satisfied is satisfied by attachment to an adjacent carbon atom of said radical when not satisfied by hydrogen, with chlorine on a mole per mole level until substantially one mole of chlorine has reacted with one mole of the hydrocarbon to produce an allylic chloride and hydrogen chloride and subjecting the resulting chlorinated product to reaction with an alcoholic caustic solution, the alcohol in said solution being a low molecular weight alkyl alcohol.

6. A process for preparing a mixture of 2-methyl-6-methylene-1,7-octadiene-3-ol and 2-methyl-6-methylene-2,7-octadiene-1-ol which includes the steps of reacting myrcene with chlorine on about a mole to mole level and thereafter subjecting the resulting chlorinated myrcene to hydrolysis in an aqueous alkaline medium.

7. A process for preparing a mixture of 2,6-dimethyl-2,4,6-octatriene-1-ol and 2,6-dimethyl-1,4,6-octatriene-3-ol which includes the steps of reacting alloocimene with chlorine on about a mole to mole level and thereafter subjecting the resulting chlorinated alloocimene to hydrolysis in an aqueous alkaline medium.

8. A process for preparing a mixture of 2-methyl-6-methylene-1-octene-3-ol and 2-methyl-6-methylene-2-octene-1-ol which includes the steps of reacting 2-methyl-6-methylene-2-octene with chlorine on about a mole to mole level and subjecting the resulting chlorinated product to hydrolysis in an aqueous alkaline medium.

9. A process for preparing 2,6-dimethyl-1,7-octadiene-3-ol and 2,6-dimethyl-2,7-octadiene-1-ol which includes the steps of reacting 2,6-dimethyl-2,7-octadiene with chlorine on about a mole to mole level and thereafter subjecting the resulting chlorinated product to hydrolysis in an aqueous alkaline medium.

10. A process for preparing 2,6-dimethyl-1,6-octadiene-3-ol and 2,6-dimethyl-2,6-octadiene-1-ol which includes the steps of reacting 2,6-dimethyl-2,6-octadiene with chlorine on about a mole to mole level and subjecting the resulting chlorinated product to hydrolysis in an aqueous alkaline medium.

11. A process for preparing 2,6-dimethyl-1-octene-3-ol and 2,6-dimethyl-2-octene-1-ol which includes the steps of reacting 2,6-dimethyl-2-octene with chlorine on about a mole to mole level and thereafter subjecting the resulting chlorinated product to hydrolysis in an aqueous alkaline medium.

12. 3-chloro-2-methyl-6-methylene-1-octene.

13. 3-chloro-2,6-dimethyl-1,7-octadiene.

14. 3-chloro-2,6-dimethyl-1-octene.

15. Tri-unsaturated monochloro compounds selected from the group consisting of 3-chloro-2-methyl-6-methylene-1,7-octadiene and 3-chloro-2,6-dimethyl-1,4,6-octatriene.

16. Tri-unsaturated monohydroxy compounds selected from the group consisting of 2-methyl-6-methylene-1,7-octadiene-3-ol, 2 - methyl-6-methylene-2,7-octadiene-1-ol, and 2,6-dimethyl-1,4,6-octatriene-3-ol.

17. Di-unsaturated monohydroxy compounds selected from the group consisting of 2-methyl-6-methylene-1-octene-3-ol, 2-methyl-6-methylene-2-octene-1-ol.

18. Mono-unsaturated monohydroxy compounds selected from the group consisting of 2,6-dimethyl-1-octene-3-ol and 2,6-dimethyl-2-octene-1-ol.

19. Tri-unsaturated monomethoxy compounds selected from the group consisting of 3-methoxy-2-methyl-6-methylene-1,7-octadiene and 1-methoxy-2-methyl-6-methylene-2,7-octadiene.

20. Mono-unsaturated monoacetate compounds selected from the group consisting of 2,6-dimethyl-1-octenyl-3-acetate and 2,6-dimethyl-2-octenyl-1-acetate.

21. 2,6-dimethyl-1,7-octadiene-3-ol.

22. 2,6-dimethyl-2,7-octadiene-1-ol.

References Cited in the file of this patent

UNITED STATES PATENTS

| | | |
|---|---|---|
| 2,677,701 | Surmatis et al. | May 4, 1954 |
| 2,794,826 | Bell et al. | June 4, 1957 |
| 2,806,874 | Surmatis | Sept. 17, 1957 |
| 2,833,811 | Surmatis | May 6, 1958 |

OTHER REFERENCES

Fischer et al.: Ber. Deut. Chem. 68, 1730 (1935).
Simonsen et al.: "The Terpenes," vol. I, Second Edition, 1953, pp. 26–70.